No. 873,970. PATENTED DEC. 17, 1907.
T. UMRATH.
GRAIN DRILL.
APPLICATION FILED APR. 12, 1905.

3 SHEETS—SHEET 1.

Witnesses
Inventor
Theodor Umrath
Attys

No. 873,970. PATENTED DEC. 17, 1907.
T. UMRATH.
GRAIN DRILL.
APPLICATION FILED APR. 12, 1905.

3 SHEETS—SHEET 2.

No. 873,970. PATENTED DEC. 17, 1907.
T. UMRATH.
GRAIN DRILL.
APPLICATION FILED APR. 12, 1905.
3 SHEETS—SHEET 3.
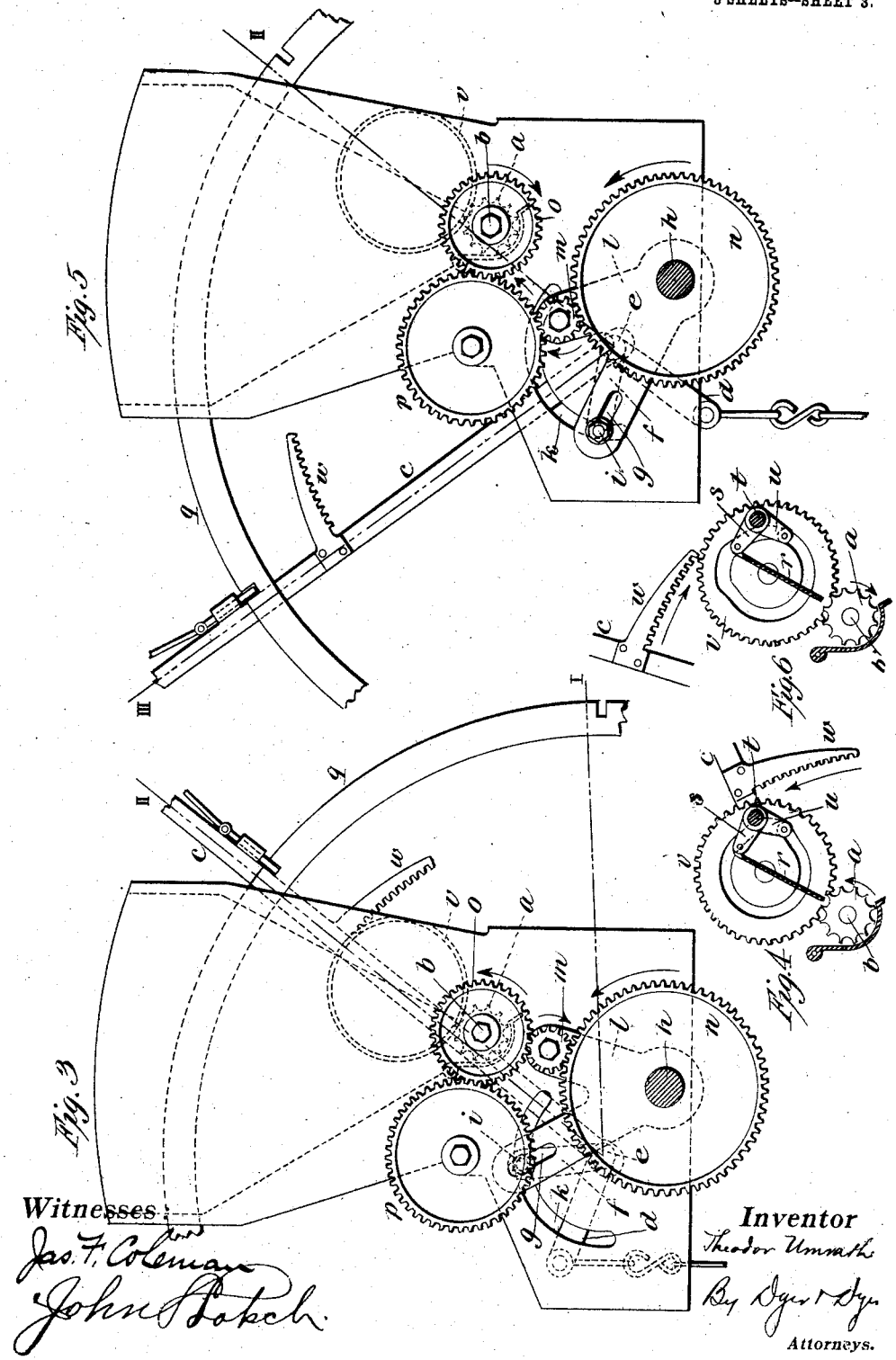
Witnesses
Inventor
Theodor Umrath
By Dyer & Dyer
Attorneys.

UNITED STATES PATENT OFFICE.

THEODOR UMRATH, OF WYSOTSCHAN, NEAR PRAGUE, AUSTRIA-HUNGARY, ASSIGNOR TO THE FIRM OF THEODOR UMRATH COMMANDITGESELLSCHAFT, OF WYSOTSCHAN, NEAR PRAGUE, AUSTRIA-HUNGARY.

GRAIN-DRILL.

No. 873,970.     Specification of Letters Patent.     Patented Dec. 17, 1907.

Application filed April 12, 1905. Serial No. 255,083.

*To all whom it may concern:*

Be it known that I, THEODOR UMRATH, manufacturer of farming implements, a citizen of the Empire of Germany, residing at Wysotschan, near Prague, in the Kingdom of Bohemia, Empire of Austria-Hungary, (whose post-office address is Wysotschan, near Prague, Kingdom of Bohemia, Empire of Austria-Hungary,) have invented certain new and useful Improvements in Grain-Drills, of which the following is a specification.

My invention relates more particularly to an improved apparatus for sowing wet, germinated seed and my objects are to provide a machine which will sow such seed without permitting the delivery to become clogged by the wet seed sticking together and to the feed wheels. This may be accomplished by changing the direction of rotation of the feed wheels so that the seeds will be fed alternately over and under the wheels and at the same time adjust the feed opening for the over feed without stopping the machine.

Figure 1:
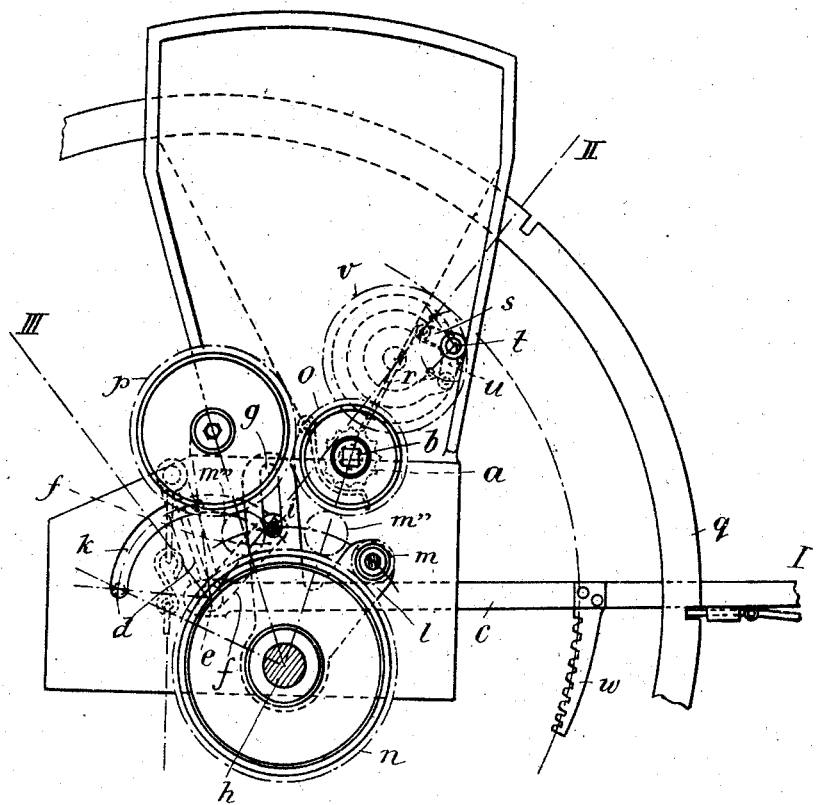
Figure 2:
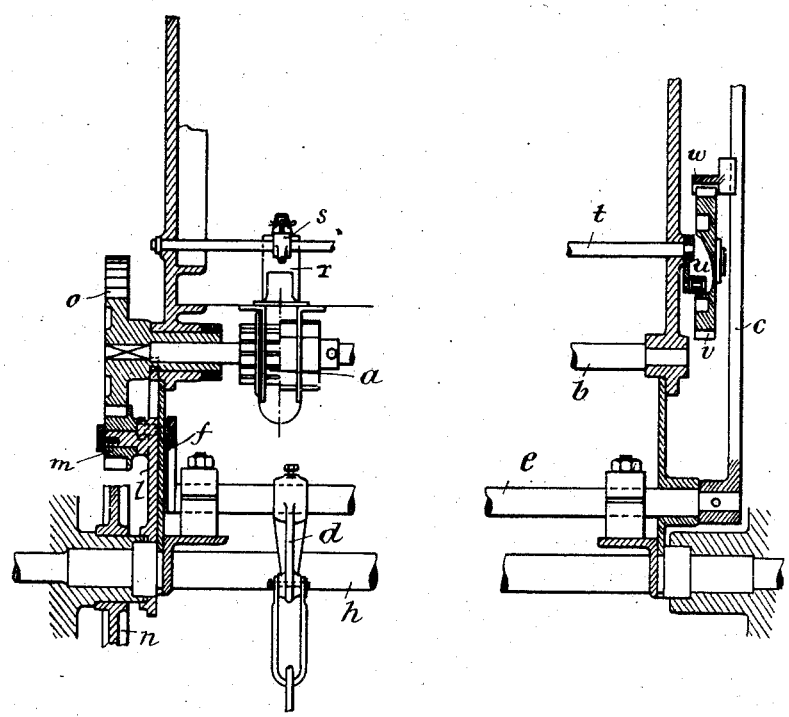

One embodiment of my invention is illustrated in the accompanying drawings, in which corresponding letters of reference indicate the same parts in all of the figures, and in which Figure 1 is a side view of a portion of a grain drill showing my improvements applied thereto with the parts in the position they occupy when the machine is not feeding. Fig. 2 is a cross section of a portion of the machine with parts broken away; Fig. 3 is a side view showing the parts in the position for feeding from the under side of the feed wheels; Fig. 4 is a detail view of parts of the apparatus in the position shown in Fig. 3; Fig. 5 is a view similar to Fig. 1, showing the parts in position for feeding from the upper side of the feed wheels, and Fig. 6 is a detail view of parts of the apparatus in the position shown in Fig. 5.

The drawings show my improved apparatus as applied to a grain drill of ordinary type, in which the furrowing and covering shares (not shown) may be pivoted so as to be lifted from the ground when the machine is being transported from place to place, and lowered so as to engage with the ground to open and close the furrow. It will be seen that the lever for changing the direction of feed and the regulation of the feed opening is also used for raising and lowering the shares.

$h$ represents the drive shaft of my improved apparatus, which shaft may be the axle of the ground wheels, or it may be a counter shaft driven therefrom. The shaft $h$ is carried by the main frame of the machine in the ordinary manner and the frame also supports the usual hopper or seed box. Mounted in the sides of the seed box is a transverse shaft $b$ which carries the feed wheels $a$ of the box and also the spur gear $o$.

Keyed to the shaft $h$ or to the hub of the ground wheel is a spur gear $n$ and meshing with this gear is a pinion $m$, carried by the arm $l$ of an angle lever pivoted on the shaft $h$. The arm $g$ of the angle lever is provided with a slot which works over a pin $i$ secured in the end of a lever $f$, carried on one end of a rock shaft $e$, which extends across the machine under the seed box. The pin $i$ projects through a segmental slot in the side of the seed box to connect the levers $g$ and $f$. Secured to the other end of the rock shaft $e$ is a hand lever $c$, which works over a toothed sector $q$, and is provided with a catch to hold it in the desired position on the sector.

Rigidly secured to the shaft $e$ are the share arms $d$, each of which is provided with suitable connections for manipulating the shares (not shown). Mounted on the side of the seed box and in mesh with the spur gear $o$ is a spur gear $p$, whose teeth are the same distance from the gear or pinion $m$ as are the teeth of the gear $o$, so that the pinion $m$, which is always in mesh with the gear $n$, may be brought into mesh with either of the gears $o$ or $p$.

Journaled in the sides of the seed box, and extending transversely therethrough, is a rock shaft $t$, which has rigidly secured thereto a lever $s$ over each feed wheel, and is provided at one end with a lever $u$ carrying a roller which engages in a cam groove in the side of a spur wheel $v$ mounted on the side of the seed box. Depending from each lever $s$ is a slide $r$ which is adapted to open or close the feed opening for the over feed of the wheels $a$. The hand lever $c$ carries a toothed sector $w$, which may be brought into mesh with the teeth of the gear $v$, to revolve the gear in one direction or the other.

The operation of my improved apparatus is as follows: The parts being in the position shown in Fig. 1, with the pinion m in engagement with the spur wheel n only, and the lever d in its vertical position raising the share from the ground, the machine may be transported on its own wheels without its feeding mechanism operating. When the lever c is moved to the position II (Fig. 3) the pin i of the lever f will have shifted the arm l of the angle lever bringing the pinion m into mesh between the gears n and o, when the feed wheel will be revolved in the direction of the arrow as the wet, germinated seed will be fed out from the under side of the feed wheel a, and the slide r will be nearly in contact with the periphery of the feed wheel, thereby closing the feed opening at that point and feeding the seeds from the under side of the feed wheel. At the same time the share lever will be lowered to allow the shares to enter the ground and make the furrow. When it becomes necessary to change the feed, the lever c will be moved to the position III (Fig. 5) when the pinion m will be brought into mesh between the gears n and p, so that the spur o will be driven through gears n, m, and p, whereby the feed wheel will be revolved in the opposite direction and the sector w will engage the spur wheel v giving it a partial revolution, when the cam on its side will swing the rock shaft t and levers s to raise the slides r and allow the seeds to be fed over the tops of the feed wheels a, and the shares, through their flexible connections with the levers d, will still be resting on the ground.

Having now described my improved apparatus, what I claim and desire to secure by Letters Patent is as follows:

1. In a grain drill, the combination with a hopper and a feed wheel, of means for changing the direction of feed of the feed wheel.

2. In a grain drill, the combination with a hopper and seed feeding means carried therein, of means for rotating the feeding means and means for changing the direction of rotation of the feeding means.

3. In a grain drill, the combination with a hopper, a feed wheel within the hopper, and a feed opening in the hopper, of means for continuously rotating the feed wheel, means for reversing the direction of rotation of the feed and means for regulating the feed opening.

4. In a grain drill, the combination with a hopper, a feed wheel within the hopper, and a feed opening in the hopper, of means for continuously rotating the feed wheel, means for simultaneously reversing the direction of rotation of the feed and for regulating the feed opening.

5. In a grain drill, the combination with a hopper, a feed wheel, a spur gear on the feed wheel shaft and an idler meshing with the spur wheel, of a main gear wheel, a pinion meshing with the main gear and means for causing the pinion to mesh with the feed wheel gear, and means for causing the pinion to mesh with the idler for causing the reversal of the direction of rotation of the feed wheel.

6. In a grain drill, the combination with a hopper, a feed wheel within the hopper, a feed opening adjacent to the feed wheel and a gate for closing or opening the feed opening, of means for changing the direction of rotation of the feed wheel, a rock shaft supporting the gate and means carried by the feed changing means for rotating the rock shaft for opening the feed opening when the feed is in one direction and closing the opening when the feed is in the other direction.

7. In a grain drill, the combination with a hopper, a reversible feed wheel within the hopper, a feed opening in the hopper, a gate for regulating the feed opening, of a rock shaft, and a lever thereon for supporting the gate, a spur gear carried on the hopper, a cam on the gear, a lever carried by the rock shaft and engaging with the cam, a hand lever for reversing the direction of rotation of the feed wheel and a rack carried by the hand lever adapted to engage the gear and rotate it in one direction or the other to open or close the feed opening.

8. In a grain drill, the combination with a hopper, a reversible feed wheel within the hopper, a feed opening in the hopper, a gate for the opening and an arm for raising the share, of a rock shaft and means controlled by the movement of the rock shaft for reversing the direction of rotation of the feed wheel, regulating the position of the share operating arm, opening and closing the feed opening and starting and stopping the rotation of the feed wheel.

In witness whereof I have hereunto set my hand in the presence of two witnesses.

THEODOR UMRATH.

Witnesses:
　ARTHUR SCHWEINBURG,
　ADOLPH FISCHER.